United States Patent
Del Gatto (10) Patent No.: US 11,977,769 B2
(45) Date of Patent: May 7, 2024

(54) CONTROL OF BACK PRESSURE BASED ON A TOTAL NUMBER OF BUFFERED READ AND WRITE ENTRIES

(71) Applicant: Micron Technology, Inc., Boise, ID (US)

(72) Inventor: Nicola Del Gatto, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 60 days.

(21) Appl. No.: 17/903,716

(22) Filed: Sep. 6, 2022

(65) Prior Publication Data
US 2023/0236758 A1   Jul. 27, 2023

Related U.S. Application Data

(60) Provisional application No. 63/303,903, filed on Jan. 27, 2022.

(51) Int. Cl.
*G06F 3/06* (2006.01)
(52) U.S. Cl.
CPC .......... *G06F 3/0656* (2013.01); *G06F 3/0604* (2013.01); *G06F 3/0611* (2013.01); *G06F 3/0653* (2013.01); *G06F 3/0659* (2013.01); *G06F 3/0673* (2013.01)
(58) Field of Classification Search
CPC .... G06F 3/0656; G06F 3/0604; G06F 3/0611; G06F 3/0653; G06F 3/0659; G06F 3/0673
See application file for complete search history.

(56) References Cited

U.S. PATENT DOCUMENTS

| | | | |
|---|---|---|---|
| 2011/0047400 A1* | 2/2011 | Blackmon | G06F 11/141 |
| | | | 713/400 |
| 2011/0179200 A1* | 7/2011 | Sukonik | G06F 13/1642 |
| | | | 710/53 |
| 2020/0050366 A1* | 2/2020 | Bavishi | G06F 3/061 |

* cited by examiner

*Primary Examiner* — Mark A Giardino, Jr.
(74) *Attorney, Agent, or Firm* — Wood IP LLC; Theodore A. Wood (57) ABSTRACT

A memory controller may calculate a sum of a first number of entries stored in a read buffer and a second number of entries stored in a write buffer. If the sum is less than a first threshold and the read/write buffer is not full of entries, then the memory controller can request read/write commands from a host computing device. If the sum is not less than the first threshold or the read/write buffer is full of entries, then the memory controller can assert backpressure to stop the incoming flow newly incoming read/write commands from the host computing device. Additionally, or alternatively, the memory controller may dequeue a write command entry only if a number of write command entries stored in a write command FIFO memory is greater than a second threshold. The memory controller may dequeue read command stored in a read FIFO memory if the number of write command entries stored in the write command FIFO memory is less than or equal to the second threshold and the read FIFO memory is not empty of the read command entries.

15 Claims, 7 Drawing Sheets

CONTROL OF BACK PRESSURE BASED ON A TOTAL NUMBER OF BUFFERED READ AND WRITE ENTRIES

CROSS REFERENCE TO RELATED APPLICATIONS

This application claims priority from U.S. Provisional Application No. 63/303,903 filed Jan. 27, 2022, the contents of which is hereby incorporated by reference. Additionally, this application is related to the following commonly assigned U.S. Patent Applications: entitled "Memory Media Row Activation-Biased Caching;" entitled "RHR Interrupts to the Operating System;" entitled "Practical Space Saving Row Hammer Detector;" entitled "Area Optimized RHR Solution for the CXL Controller;" entitled "Aliased Row Hammer Detector;" entitled "Optimized Control of Commands Running in a Cache;" and entitled "Arbitration Policy to Prioritize Read Command Dequeing by Delaying Write Command Dequeing,"the contents of each of which is hereby incorporated by reference.

FIELD OF TECHNOLOGY

The present disclosure relates to optimizing the control of read and write commands running in a cache controller including controlling a maximum number of read and write commands received by the cache controller and/or delaying the execution of a write command until the number of write command entries stored in a memory of the cache controller is greater than a threshold.

BACKGROUND

Memory devices (also referred to as "memory media devices") are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. SRAM memory may maintain their programmed states for the duration of the system being powered on. Non-volatile memory cells (e.g., NAND memory cells) may maintain their programmed states for extended periods of time even in the absence of an external power source.

Memory devices may be coupled to a host (e.g., a host computing device) to store data, commands, and/or instructions for use by the host while the computer or other electronic system is operating. For example, data, commands, control signals and/or instructions can be transferred between the host and the memory device(s) during operation of a computing or other electronic system. A controller, referred to as a "memory controller", may be used to manage the transfer of data, commands, and/or instructions between the host and the memory devices.

The commands received by the memory controller from the host may include read commands and write commands. When the host sends a write command to the memory controller, the host system can still run independently. However, when the host sends a read command to the memory controller, an application run on a CPU connected to the Host may become disadvantageously locked up or delayed while waiting for data to be acquired in response to the sent read command. Reducing the read latency may therefore be a priority over reducing the write latency. Therefore, improved techniques for managing the dequeuing and execution of read and write commands such that the read latency is reduced are desired.

The received commands including the read and write commands may impose a significant workload on the memory controller. This significant workload may result in a denial of service as the memory controller and/or memory media device is overwhelmed and must take some time off, at least in part due to its limitations on capabilities and back pressure caused by the operations already queued up or being performed by the memory controller and/or memory media device. The memory controller must disadvantageously hold off on executing commands received from the host and/or hold back traffic to the memory device. Speed (e.g., latency, data rate) of the memory controller may be impacted based on an availability of space within the total buffer space partitioned between read and write buffer space. Reducing the latency dependency such as the read latency dependency from the workload and also controlling the number of commands that run inside the memory controller is therefore desired.

DETAILED DESCRIPTION

The present disclosure describes systems, apparatuses, and methods related to controlling a flow of access commands (e.g., read commands, write commands) from a host computer system, and managing the dequeuing and execution of the received access commands. Latency of read commands may be reduced independently of read/write characteristics of a workload imposed on a memory controller, without penalizing the total read/write bandwidth. Global requests credits may be used in the present disclosure to control the commands running on the memory controller even if there is free space inside the read and write buffers. Dequeuing and execution of the read commands may be prioritized over the dequeuing and execution of the write commands by delaying the dequeuing and execution of the write commands until a number of waiting write commands goes over a threshold.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

Figure 1:
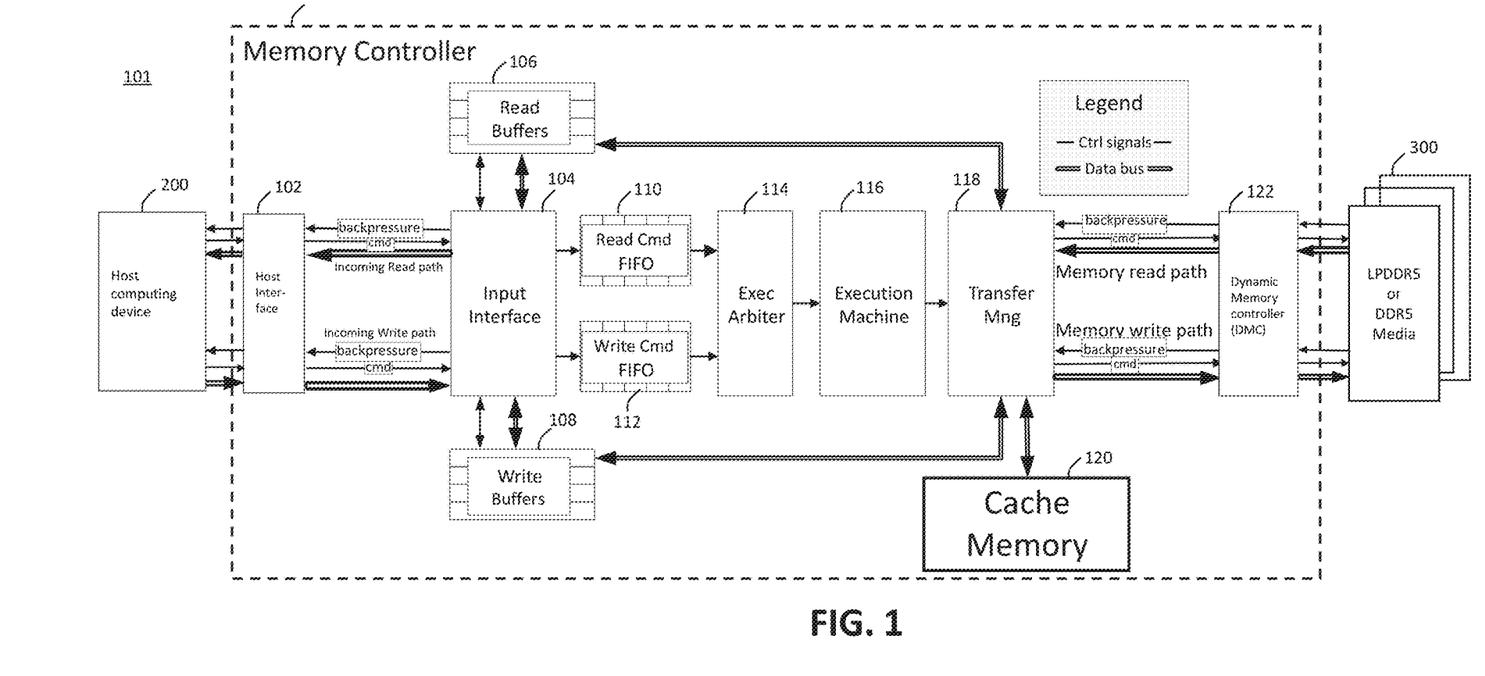
FIG. 1 illustrates an example functional block diagram showing a computing system including a memory controller according to some example embodiments of the present disclosure.

FIG. 1 illustrates an example functional block diagram in the form of a computing system 101 including a memory controller 100, a host computing device 200 and memory media device 300. The memory controller 100 can be operatively coupled to the host computing device 200 (i.e., host computer system) and memory media device 300. The host computing device 200 may at least include an operating system and a CPU which may communicate with each other via a bus or other communications mechanisms including wireless communications mechanisms.

In the embodiment illustrated in FIG. 1, the memory media device 300 may be low power double data rate (LPDDR) LP5 or LP5A DRAM media. However, embodiments are not limited thereto, and memory media device 300 may comprise one or more memory media of any memory media types, such as, but not limited to, types of RAM memory cells, such as DRAM memory cells and SDRAM memory cells.

The memory controller 100 may be configured for controlling a maximum total number of read and write commands to be received by the memory controller 100 and/or dequeuing and executing a write command only when the number of stored write command entries exceeds a threshold in accordance with some embodiments of the present disclosure. As illustrated in FIGS. 1-3 and 5, non-limiting, example embodiments of the memory controller 100 may include the following features: a host interface 102, an input interface 104, at least one read buffer 106, at least one write buffer 108, a read command FIFO 110, a write command FIFO memory 112, an execution arbiter 114, an execution machine 116, a cache memory 120, and a dynamic memory controller (DMC) 122.

The host interface 102 may be operatively coupled to the host computing device 200 and the input interface 104 through input/output (I/O) paths such as control signal lines and data bus lines. Commands, control signals, and/or data may be communicated between the host computing device 200 and the input interface 104 through the host interface 102. The communications over the I/O paths to the host computing device 200 may be according to a protocol such as, for example, Peripheral Component Interconnect Express (PCIe). In some embodiments, the plurality of I/O paths can be configured as a single port. Example embodiments are not limited by the number of I/O paths, whether or not the I/O paths belong to a single port, or by the communication protocol for communicating with the host computing device 200. The host interface 102 may handle the protocol such as the Compute Express Link™ (CXL) protocol to communicate with the host computing device 200 such that the memory controller 100 may be regarded as a "CXL Controller".

The communications over the I/O paths to the host computing device 200 may include commands and/or control signals such as back pressure commands and/or control signals indicating to the host computing device 200 that no new read and/or write commands should be transmitted to the memory controller 100. These commands and/or control signals may reduce or completely stop data traffic such as read and/or write commands from being transmitted from the host computing device 200 to memory controller 100 and thus the memory media device 300 as well. The host interface 102 may include interface management circuitry including data link and transaction control which may provide higher layer protocol support for communications with the host computing device 200 through the host interface 102.

The input interface 104 may communicate commands, control signals and/or data to the host computing device 200 through the host interface 102. The input interface 104 may handle input indication protocol and manage back pressure to the host computing device 200. The input interface 104 may also be operatively coupled to the read buffer 106, write buffer 108, read command FIFO 110, and write command FIFO memory 112. The input interface 104 may communicate control signals and data with each of the read buffer 106 and write buffer 108 via corresponding control signal lines and data bus lines. The input interface 104 may communicate read commands to the read command FIFO 110 and may communicate write commands to the write command FIFO memory 112.

The at least one read buffer 106 may store data received from the cache memory 120 and/or memory media device 300 through the transfer manager 118 as a result of the execution of a read command by the memory controller 100. The read buffer 106 may also serve incoming read commands. The read buffer 106 may include a number (e.g., 64 or a multiple of 64) of entries, each of which forms or corresponds to a read command.

A determination may be made regarding whether or not the read buffer 106 is full, that is, whether or not the read buffer's capacity for storing read commands has been completely reserved (e.g., all 64 entries of the read buffer 106 are being used). The number of entries used in the read buffer 106 for storing corresponding read commands may also be determined and added to the number of entries used in the write buffer 108 for storing write commands to determine a total sum of the used entries in the read buffer 106 and the write buffer 108.

The number of entries is used for comparison to a first threshold ("CacheMaxCredits" in FIGS. 2-3) to determine that a new incoming read command can be requested by the memory controller 100. Alternatively, the number of entries can be used to determined that a flow of new incoming read commands is to be stopped by the memory controller 100 via asserted back pressure for read commands (see FIGS. 2-4). The specific value of the first threshold "CacheMaxCredits" is configurable and may be determined at least based on the amount of read and write traffic to the memory media device 300 and/or the size of the cache memory 120.

The write buffer 108 may communicate data to the cache memory 120 and/or memory media device 300 through the transfer manager 118 such that the data (e.g., data received from the host computing device 200) may be written to the cache memory 120 and/or memory media device 300 as a result of the execution of a write command by the memory controller 100. The write buffer 108 may also serve incoming write commands. The write buffer 108 may include a number (e.g., 64 or a multiple of 64, same as the read buffer 106) of entries, each of which forms or corresponds to a write command.

Figure 2:
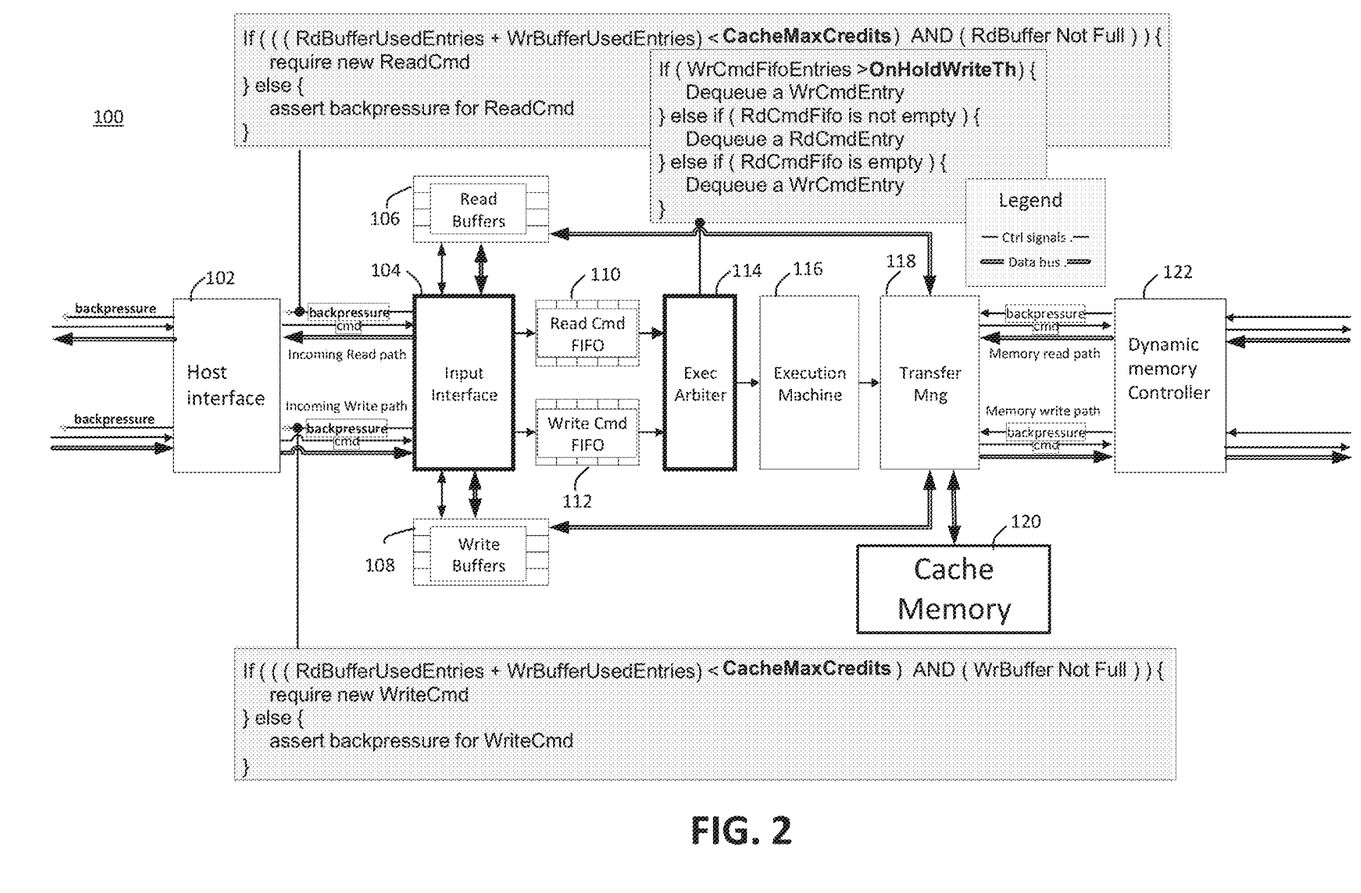
FIG. 2 illustrates an example functional block diagram showing a memory controller according to some example embodiments of the present disclosure.
Figure 3:
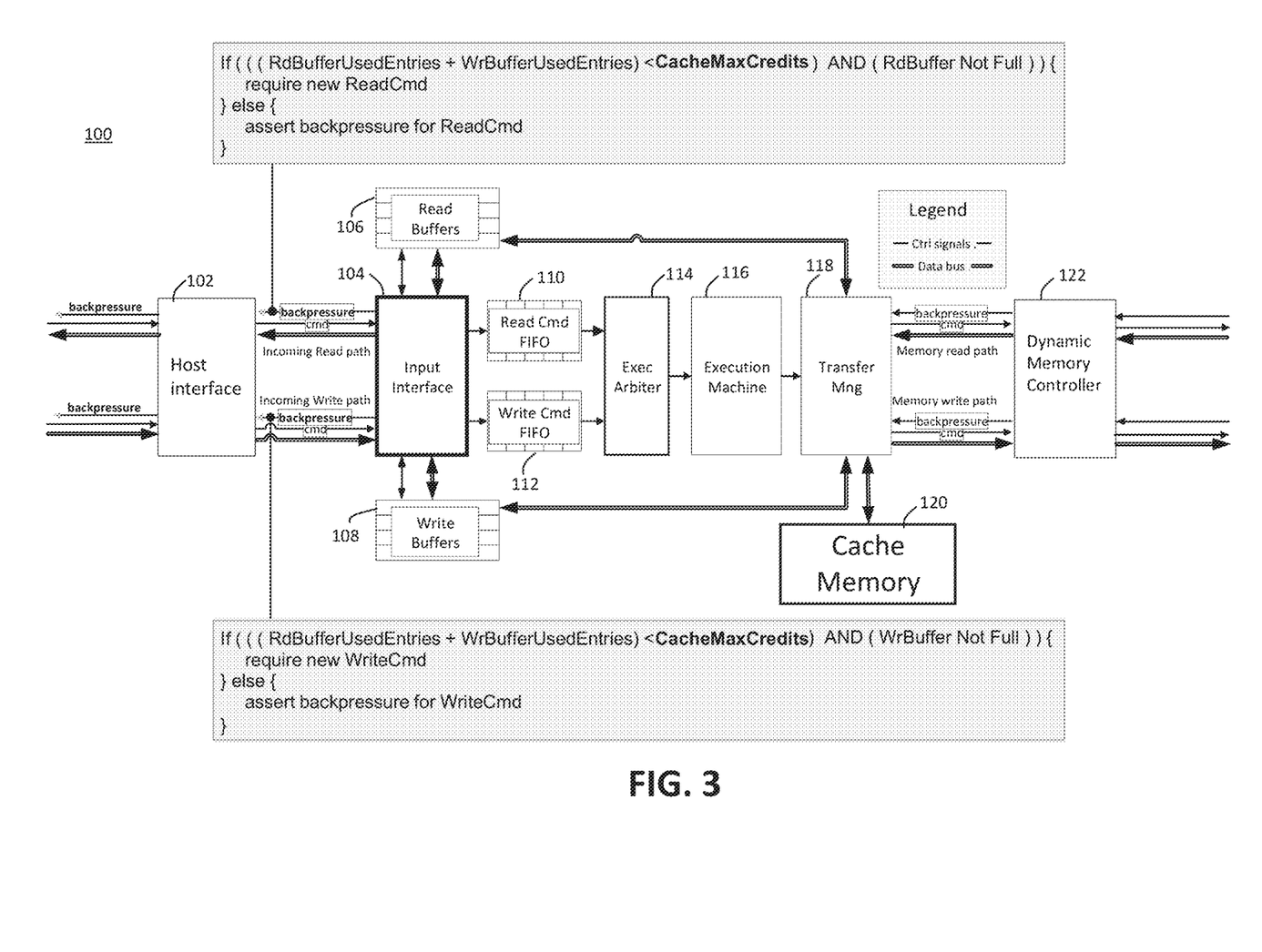
FIG. 3 illustrates an example functional block diagram showing a memory controller including an input interface according to some example embodiments of the present disclosure.
Figure 4:
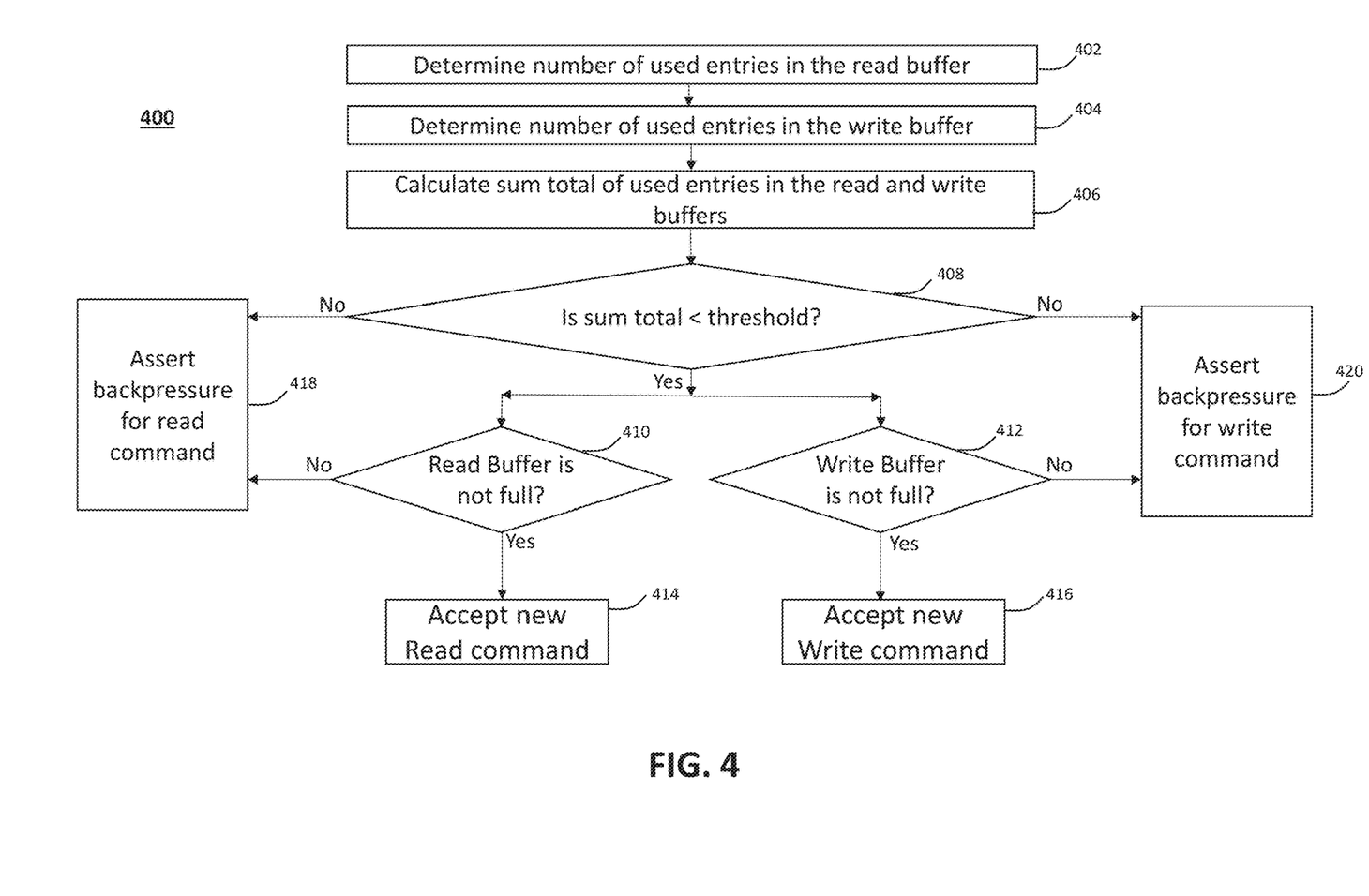
FIG. 4 illustrates a flowchart depicting a process performed by a memory controller including the input interface according to some example embodiments of the present disclosure.

A determination may be made regarding whether or not the write buffer 108 is full, that is, whether or not the write buffer's capacity for storing write commands has been completely reserved (e.g., all 64 entries of the write buffer 108 are being used). The number of entries used in the write buffer 108 for storing corresponding write commands may also be determined and added to the number of entries used in the read buffer 106 for storing corresponding read commands to determine a total sum of the used entries in the read buffer 106 and the write buffer 108. The number of entries is used for comparison to a first threshold ("CacheMaxCredits" in FIGS. 2-3) to determine whether a new incoming write command can be asked for by the memory controller 100. Alternatively, the number entries can be used to determine that an input of a new incoming write command is to be stopped by the memory controller 100 via asserted back pressure for write commands as shown in FIGS. 2-4.

The read command FIFO 110 is operatively coupled with the input interface 104 and the execution arbiter 114. The read command FIFO 110 may store read commands received from the input interface 104. The stored read commands may be enqueued and then dequeued on a first-in, first-out basis. The read command FIFO 110 may, for example, include 64 entries (although this may be configured to be a different number of entries such as a multiple of 64), each entry or line forming or corresponding to a read command being handled by the memory controller 100. The size or capacity of the read command FIFO 110 for storing read command entries may therefore be the same as the size or capacity of the read buffer 106 for storing read command entries.

The write command FIFO memory 112 is operatively coupled with the input interface 104 and the execution arbiter 114. The write command FIFO memory 112 may store write commands received from the input interface 104. The stored write commands may be enqueued and then dequeued on a first-in, first-out basis. The write command FIFO memory 112 may, for example, include 64 entries (although this may be configured to be a different number of entries such as a multiple of 64), each entry or line forming or corresponding to a write command being handled by the memory controller 100. The size or capacity of the write command FIFO memory 112 for storing write command entries may therefore be the same as the size or capacity of the write buffer 108 for storing write command entries.

The execution arbiter 114 may select an enqueued command to be dequeued and executed from the read command FIFO 110 on a first-in, first-out basis or the write command FIFO memory 112 on a first-in, first-out basis. The processing performed by the execution arbiter 114 may include determining the number of write command entries stored in the write command FIFO memory 112, and then comparing that number of write command FIFO entries with a second threshold ("OnHoldWriteTh" in FIGS. 2 and 5) to determine whether or not to dequeue and execute a write command entry from the write command FIFO memory 112. In some example embodiments, a write command entry from the write command FIFO memory 112 will be dequeued and executed only if the number of write command FIFO entries is greater than the second threshold ("OnHoldWriteTh").

The execution machine 116 is operatively coupled to the execution arbiter 114 and the transfer manager 118. The execution machine 116 forms a set of state machines needed to execute a command. This command may be the command selected by and received from the execution arbiter 114. Data and/or control signals may be output by the execution machine 116 as a result of the execution of the command to the transfer manager 118.

The transfer manager 118 is operatively coupled to the read buffer 106, write buffer 108, and cache memory 120. The transfer manager may also be operatively coupled to the memory media device 300 through the DMC 122. The transfer manager 118 may handle data moving between the read and write buffers 106 and 108, cache memory 120 and memory media device 300.

For example, when the memory controller 100 receives a read command from the host computing device 200 and that read command is dequeued from the read command FIFO 110 upon selection by the execution arbiter 114 and executed by the execution machine 116, the data requested may be transferred by the transfer manager 118 to the read buffer 106 from the cache memory 120 if available in that local cache memory 120. Alternatively, it may be transferred from the memory media device 300 if the data requested is not available in that local cache memory 120.

As another example, when the memory controller 100 receives a write command from the host computing device 200 and that write command is dequeued from the write command FIFO memory 112 upon selection by the execution arbiter 114 and executed by the execution machine 116, the data to be written may be transferred by the transfer manager 118 from the write buffer 108 to the cache memory 120 and/or to memory media device 300 through the DMC 122. In more detail, if a cache write policy is "Write Back", data is always moved from the write buffer 108 to cache memory 120, and only during a cacheline eviction process is data stored inside the cache memory 120 moved onto the memory media device 300. If the cache write policy is "Write Through", the data is moved from the write buffer 108 to the cache memory 120 and concurrently onto the memory media device 300.

The DMC 122 of the memory controller 100 is configured to couple to one or more types of memory media device(s) 300 (e.g., DRAM media) through a plurality of channels, including control signal lines and data bus lines, which can be used to read/write data to/from the memory media device(s) 300, to transmit commands to the memory media device(s) 300, to receive status and statistics from memory media devices 300, etc. including command and data.

The processing circuitry of the memory controller 100 can couple, by initializing and/or configuring the memory controller 100 and/or the memory media device(s) 300 accordingly (e.g., in response to any commands and data from the host computing device 200), the memory controller 100 to external circuitry or an external device, such as the host computing device 200 that can generate requests to read or write data to and/or from memory media device(s) 300. The processing circuitry of the memory controller 100 is configured to recognize received commands from the host computing device 200 and to execute instructions to apply a particular operation code associated with received host commands for each of a plurality of channels coupled to the memory media device(s) 300 accordingly.

The DMC 122 may include in some embodiments a media controller portion comprising a plurality of media controllers and a physical (PHY) layer portion comprising a plurality of PHY interfaces. In some embodiments, this back end portion of the memory controller 100 is configured to couple the PHY interfaces to a plurality of memory ranks of the memory media devices 300 via the plurality of channels. A respective media controller and a corresponding PHY interface may drive a channel to a memory rank. In some embodiments, each media controller can execute commands independent of the other media controllers.

Therefore, data can be transferred from one PHY interface through a channel to memory media device 300 independent of other PHY interfaces and channels. Each PHY interface may operate in accordance with a PHY layer that couples the memory controller 100 to one or more memory ranks in the memory media device 300. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can be the plurality of channels. As used herein, the term "memory ranks" generally refers to a plurality of memory chips (e.g., DRAM memory chips) that can be accessed simultaneously.

In some embodiments, a page size of a first type of memory device can be larger than a page size of the second type of memory device. Example embodiments, however, are not limited to particular widths of memory ranks or page sizes. Rank, channel, and bank can be considered hardware-dependent logical groupings of storage locations in the memory media device 300. The mapping of rank, channel and bank logical groupings to physical storage locations or rows in the memory media device 300 may be preconfigured, or may be configurable, in some embodiments by the memory controller 100 in communication with the memory media device 300.

In some embodiments, the memory controller 100 can be a Compute Express Link™ (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning.

CXL technology is built on the peripheral component interconnect express (PCIe) infrastructure, leveraging PCIe physical and electrical interfaces to provide advanced protocol in areas such as I/O protocol, memory protocol (e.g., initially allowing a host to share memory with an accelerator), and coherency interface. When the memory controller 100 is CXL compliant, the processing circuitry of the memory controller 100 may use CXL protocols to manage the host interface 102 which may comprise PCIe PHY interfaces.

According to some embodiments, the memory media device(s) 300 includes one or more DRAM devices. In some embodiments, main memory is stored in DRAM cells that have high storage density. DRAM cells lose their state over time. That is, the DRAM cells must be refreshed periodically, hence the name "Dynamic." DRAM can be described as being organized according to a hierarchy of storage organization comprising DIMM, rank, bank, and array.

A DIMM comprises a plurality of DRAM chips, and the plurality of chips in a DIMM are organized into one or more "ranks". Each chip is formed of a plurality of "banks". A bank is formed of one or more "rows" of the array of memory cells. All banks within the rank share all address and control pins. All banks are independent, but in some embodiments only one bank in a rank can be accessed at a time. Because of electrical constraints, only a few DIMMs can be attached to a bus. Ranks help increase the capacity on a DIMM.

Multiple DRAM chips are used for every access to improve data transfer bandwidth. Multiple banks are provided so that the computing system can be simultaneously working on different requests. In the embodiment illustrated in FIG. 1, the memory media device may be an LPDDR5 or DDR5 DRAM media. However, embodiments are not limited thereto, and the memory media device(s) 300 may comprise one or more memory media of any memory media types, such as, but not limited to, types of DRAM.

Each of the plurality of media controllers can receive a same command and address and drive the plurality of channels substantially simultaneously. By using the same command and address for the plurality of media controllers, each of the plurality of media controllers can utilize the plurality of channels to perform the same memory operation on the same plurality memory cells. As used herein, the term "substantially" intends that the characteristic need not be absolute but is close enough so as to achieve the advantages of the characteristic.

For example, "substantially simultaneously" is not limited to operations that are performed simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the multiple memory controllers can be utilized such that they are writing data to the memory devices at the same time, regardless if one of the media controllers commences or terminates prior to the other.

The functions of the memory controller 100 described herein, such as but not limited to the interfaces 102 and 104, execution arbiter 114, execution machine 116, transfer manager 118 and DMC 122, may be implemented by processing circuitry such as hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims.

For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Furthermore, the "processing circuitry" and/or various illustrative blocks and components described in connection with the disclosure herein (including the claims) may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As illustrated in FIGS. 2-4, the memory controller 100, and in particular the input interface 104 as implemented by the processing circuitry of the memory controller 100, may be configured to introduce a global requests credits to control the commands running on the memory controller 100 even if there is free space available inside the read buffer 106 and the write buffer 108. The input interface 104 of the memory controller 100 may communicate with the host computing device 200 via the host interface 102 through a mechanism called credits.

Backpressure may be asserted by the memory controller 100 when the number of used entries in the read buffer 106 plus the number of used entries in the write buffer 108 is less than a first threshold ("CacheMaxCredits" in FIGS. 2-3) to reduce or stop the credit exchange between the host computing device 200 and the input interface 104 of the memory controller 100.

The maximum number of read and write commands received by the memory controller 100 and stored by the read and write buffers 106 and 108 may be controlled by acting on incoming back pressure by stopping the flow new incoming read and/or write commands even if there is space available inside of the read and write buffers 106 and 108.

The memory controller 100, and in particular the input interface 104 as implemented by the processing circuitry of the memory controller 100, may perform control to permit or stop incoming read and/or write commands by performing a process 400. Execution of the process 400 may be repeated by the memory controller 100 on a regular periodic basis and/or may be repeated based upon a particular triggering event such as the receipt of a new incoming read or write command from the host computing device 200.

The memory controller 100 may determine the number of used entries in the read buffer 106 at operation 402. In other words, the memory controller 100 may determine the number of entries stored in the read buffer 106, each of those entries forming or corresponding to a read command. The memory controller 100 may also determine the number of used entries in the write buffer 108 at operation 404. In other words, the memory controller 100 may determine the number of entries stored in the write buffer 108, each of those entries forming or corresponding to a write command.

The memory controller 100 may determine a sum of the used entries in the read buffer 106 and the used entries in the write buffer 108 (see "RdBufferUsedEntries+WrBufferUsedEntries" illustrated in FIGS. 2-3) at operation 406. The total buffer allocation reserved for read and write commands stored in the read and write buffers 106 and 108 is therefore determined. At operation 408, the memory controller 100 may then compare this sum of used entries in the read and write buffers 106 and 108 to a value of a first threshold ("CacheMaxCredits" in FIGS. 2-3), which represents a maximum permitted number of total used entries to be received by the memory controller 100 from the host computing device 200 before back pressure is asserted for new incoming read and write commands.

If the sum of used entries in the read and write buffers 106 and 108 is greater than or equal to the first threshold ("No" at operation 408), then back pressure can be asserted for the incoming new read and write commands by reducing the flow or stopping the incoming new read and write commands from being received by the memory controller 100 at operations 418 and 420. More specifically, the memory controller 100 may send a control signal or command to the host computing device 200 to stop sending read and write commands to the memory controller 100.

The input flow of incoming new read and write commands that are received by the memory controller 100 would thus be reduced (e.g., reduced to zero such that no incoming read and write commands are received through the input interface 104 and hence no new incoming read and write commands are stored in the read and write buffers 106 and 108). Input read and write command back pressure is therefore asserted when the total buffer allocation currently reserved for read and write operations is greater than or equal to the first threshold.

As one particular example (although other configurations having a different number of permissible entries for each of the read and write buffers 106 and 108 and a different number for the value of the first threshold are possible), the number of possible entries in the read buffer 106 is 64 (i.e., the maximum capacity of the read buffer 106 for storing read commands is 64 entries), the number of possible entries in the write buffer 108 is 64 (i.e., the maximum capacity of the write buffer 108 for storing write commands is 64 entries), and the numerical value of the first threshold is 64.

If, for example, the number of entries currently reserved for read commands in the read buffer 106 is 33 (out of a possible 64 entries for the read buffer 106) and the number of entries current reserved for write commands in the write buffer 108 is 32 (out of a possible 64 entries for the write buffer 108), then the sum is 65 (33 entries for the read buffer 106 plus 32 entries for the write buffer 108, each of the entries forming or corresponding to an access command) which is therefore greater than the first threshold value of 64 ("No" at operation 408), then input read command back pressure and input write command back pressure may be asserted such that receipt new incoming read and write commands from the host computing device 200 are stopped by the memory controller 100 such that no new access commands are passed through the input interface 104 and hence stored by buffers 106 and 108 under that condition.

At operation 410, the memory controller 100 determines whether or not the read buffer 106 is full (e.g., whether all permitted 64 entries forming the maximum capacity for storing read commands in the read buffer 106 are currently reserved for read operations). For example, if the determined number of used entries in the read buffer 106 is at its maximum permitted capacity, a determination that the read buffer 106 is full can be made ("No" at operation 410). If the determined number of used entries in the read buffer 106 is at less than its maximum permitted capacity (e.g., less than 64 entries), then the read buffer 106 is not full ("Yes" at operation 410).

At operation 412, the memory controller 100 determines whether or not the write buffer 108 is full (e.g., whether all permitted 64 entries forming the maximum capacity for storing write commands in the write buffer 108 are currently reserved for write operations). For example, if the determined number of used entries in the write buffer 108 is at its maximum permitted capacity, a determination that the write buffer 108 is full can be made ("No" at operation 412). If the determined number of used entries in the write buffer 108 is at less than its maximum permitted capacity (e.g., less than 64 entries), then the write buffer 108 is not full ("Yes" at operation 412).

Operations 410 and 412 may be executed at essentially the same or at different times, and each of these operations 410 and 412 may be executed before or after the execution of operation 408. For example, although operation 410 may appear as a sequential step following operation 408 in FIG. 4, it will be understood that the operation of 408 may be performed before operation 410 or alternatively that operations 408 and 410 can be performed essentially simultaneously as one combined condition or test as illustrated in FIGS. 2 and 3 which shows performing logic "(RdBufferUsedEntries+WrBufferUsedEntries)<CacheMaxCredits AND (ReBuffer Not Full)" as part of a single combined conditional test.

As another example, although operation 412 may appear as a sequential step following operation 408 in FIG. 4, it will be understood that the operation of 412 may be performed before operation 408 or alternatively that operations 408 and 412 can be performed essentially simultaneously as a single combined condition or test as illustrated in FIGS. 2 and 3 which shows performing logic "(RdBufferUsedEntries+WrBufferUsedEntries)<CacheMaxCredits AND (WrBuffer Not Full)" as part of one combined conditional test. Since operations 410 and 412 can be performed independently to control respective read and write buffers, operations 410 and 412 can thus be performed at different times in any order or alternatively may be simultaneously performed.

If the read buffer 106 is full of used entries ("No" in operation 410), then back pressure for new incoming read commands is asserted such that the number of new incoming read commands from the host 200 is reduced or stopped altogether at operation 418. More specifically, the memory controller 100 may send a control signal or command to the host computing device 200 to stop sending read commands to the memory controller 100. No new incoming read commands from the host computing device 200 are received through the input interface 104 under this condition and hence no new incoming read commands from the host computing device 200 are stored in the read buffer 106.

If the write buffer 108 is full of used entries ("No" in operation 412), then back pressure for new incoming write commands is asserted such that the number of new incoming write commands from the host 200 is reduced or stopped altogether at operation 420. More specifically, the memory controller 100 may send a control signal to the host computing device 200 to stop sending write commands to the memory controller 100. No new incoming write commands from the host computing device 200 are received through the input interface 104 under this condition and hence no new incoming write commands from the host computing device 200 are stored in the write buffer 108.

In sum, the flow of new incoming read commands will be stopped from being sent from the host computing device 200 and hence new incoming read commands are not be received through the input interface 104 of the memory controller 100 or stored by the read buffer 106 of the memory controller 100 when either: (i) there is no available read buffer (because the read buffer 106 is full—"No" at operation 410) or (ii) the sum of the number of used entries in the read buffer 106 and the number of used entries in the write buffer 108 is not less than the first threshold ("No" at operation 408).

Operations 408 and 410 can be performed in any order. New incoming write commands will be stopped from being sent from the host computing device 200 and hence new incoming write commands will not be received through the input interface 104 of the memory controller 100 or stored by the write buffer 108 of the memory controller 100 when either: (i) there is no available write buffer (because the write buffer 108 is full—"No" operation 412) or (ii) the sum of the number of used entries in the read buffer 106 and the number of used entries in the write buffer 108 is not less than the first threshold ("No" at operation 408). Operations 408 and 412 can be performed in any order, as can operations 410 and 412.

The maximum workload from the host computing device 200 formed by the read and write commands to be executed may therefore be controlled starting at a point of the input interface 104. The receipt of new incoming read and write commands by the memory controller 100 may be stopped even when there is free space available inside the read and write buffers 106 and 108. The latency of read commands may be reduced independently by read/write characteristics of the workload, and the total read/write bandwidth is not penalized. The dependency of the read latency from the workload in the memory controller may be reduced and LP5 traffic is not impacted by the incoming workload characteristics.

If the sum of the used entries in the read buffer 106 and the used entries in the write buffer 108 (see "RdBufferUsedEntries+WrBufferUsedEntries" illustrated in FIGS. 2-3) is determined to be less than the first threshold "CacheMaxCredits" ("Yes" at operation 408) and the read buffer 106 is not full ("Yes" at operation 410), then the memory controller 100 may request for and receive new incoming read commands through interfaces 102 and 104 and store them in read buffer 106. This may include the memory controller 100 sending a command or control signal to the host computing device 200 asking for read commands.

If the sum of the used entries in the read buffer 106 and the used entries in the write buffer 108 (see "RdBufferUsedEntries+WrBufferUsedEntries" illustrated in FIGS. 2-3) is determined to be less than the first threshold "CacheMaxCredits" ("Yes" at operation 408) and the write buffer 108 is not full ("Yes" at operation 412), then the memory controller 100 may request for and receive new incoming write commands through interfaces 102 and 104 and store them in write buffer 108. This may include the memory controller 100 sending a command or control signal to the host computing device 200 asking for write commands. Accordingly, the maximum number of read and write commands stored by the memory controller 100 for execution is controlled by asking for new incoming read and write commands from the host computing device 200 only if the conditions at operations 408 and 410 are satisfied for read commands and only if the conditions at operations 408 and 412 are satisfied for write commands.

Read commands from the host computing device 200 that are accepted by the memory controller 100 may be enqueued in read command FIFO 110. Write commands from host computing device 200 that are accepted by the memory controller 100 may be enqueued in the write command FIFO memory 112. A read command enqueued in the read command FIFO 110 or a write command enqueued in the write command FIFO memory 112 may be dequeued upon the selection of that command by the execution arbiter 114 and execution of that selected command by the execution machine 114 as implemented by the processing circuitry of the memory controller 110.

Figure 5:
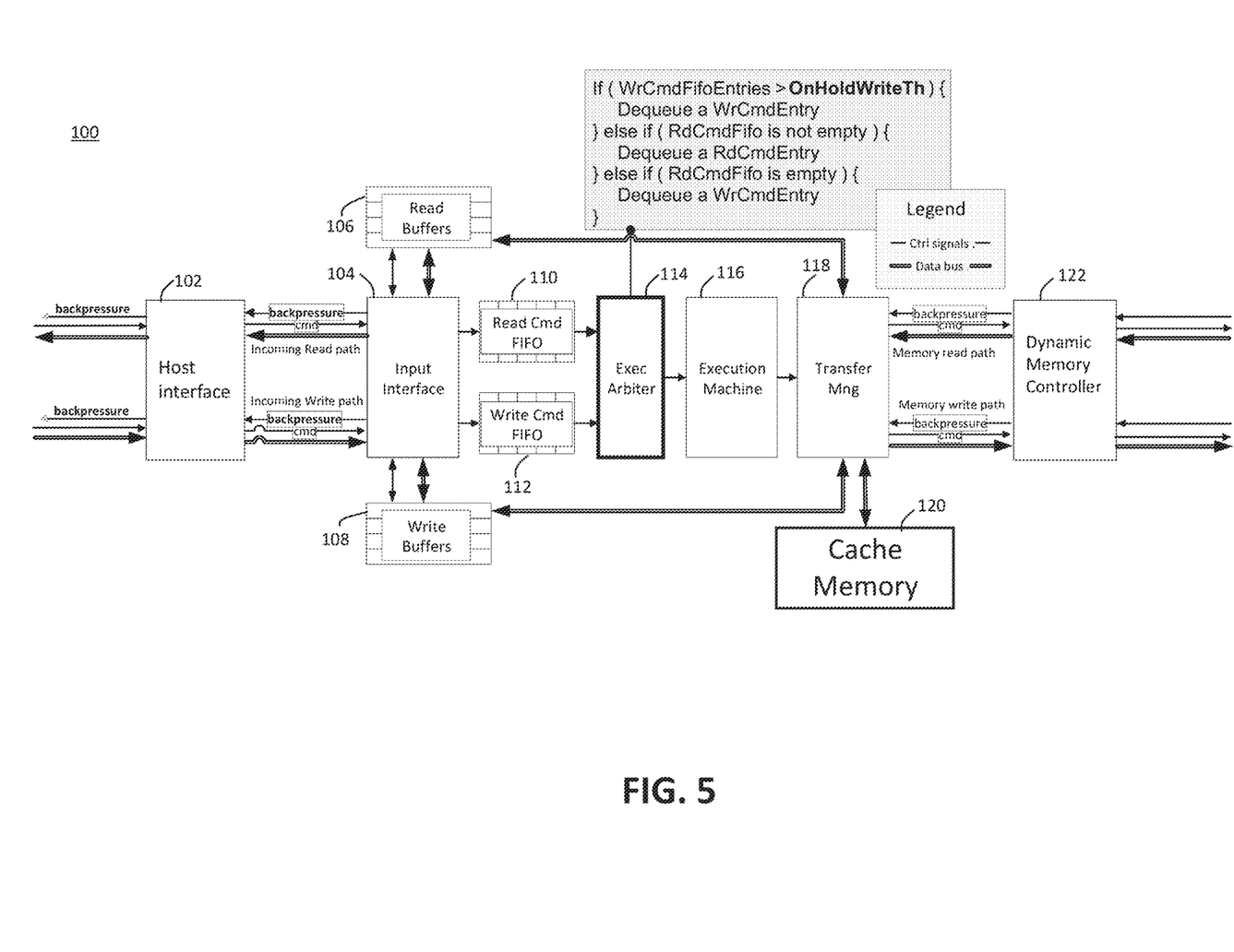
FIG. 5 illustrates an example functional block diagram showing a memory controller including an execution arbiter according to some example embodiments of the present disclosure.
Figure 6:
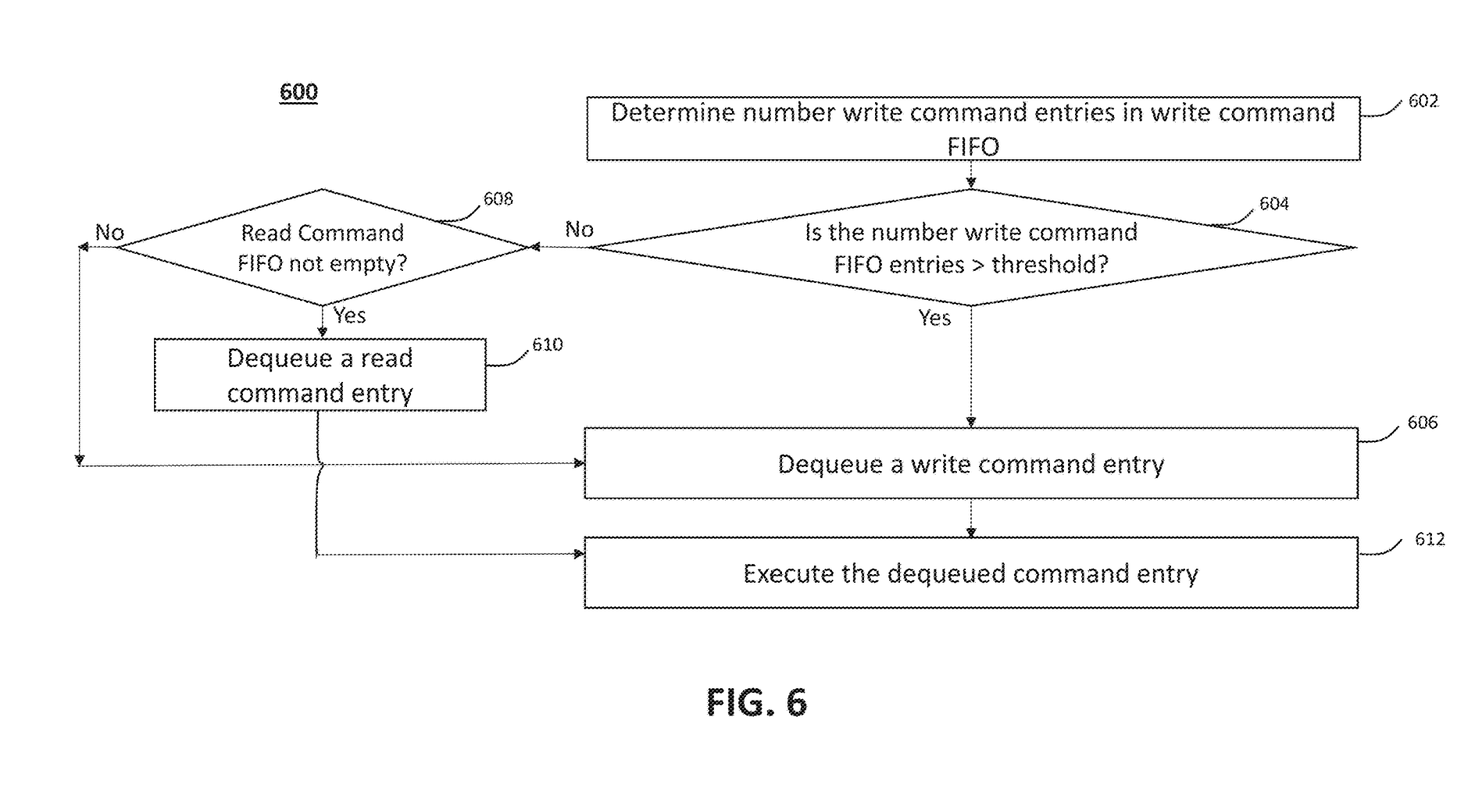
FIG. 6 illustrates a flowchart depicting a process performed by a memory controller including the execution arbiter according to some example embodiments.

As illustrated in FIGS. 2 and 5-6, the memory controller 100, and in particular, the execution arbiter 114 as implemented by the processing circuitry of the memory controller 100, may be configured to prioritize the dequeuing and execution of read commands by delaying the dequeuing and execution of write commands until the number of waiting write commands stored in the write command FIFO memory 112 exceeds a second threshold ("OnHoldWriteTh" in FIGS. 2 and 5). In particular, the memory controller 100, and in particular, the input interface 104 as implemented by the processing circuitry of the memory controller 100, may perform a process 600 to thereby reduce the read latency as compared to the write latency, but without changing the global read and write bandwidth.

Execution of the process 600 may be repeated by the memory controller 100 on a regular periodic basis and/or may be repeated based upon a particular triggering event such as the receipt of a new incoming read or write command from the host computing device 200 or the storage of a command in either the read command FIFO 110 or the write command FIFO memory 112.

The memory controller 100 may determine the number of write command entries stored in the write command FIFO memory 112 at operation 602. In other words, the memory controller 100 may determine the number of entries enqueued in the write command FIFO memory 112, each of those entries corresponding to a write command.

At operation 604, the memory controller 100 may compare the determined number of write command entries stored in the write command FIFO memory 112 to a second threshold (see "If (WrCmdFIFOEntries)>OnHoldWriteTh" in FIGS. 2 and 5). If the determined number of write command entries stored in the write command FIFO memory 112 is greater than the second threshold ("Yes" at operation 604), only then will an enqueued write command entry be dequeued from the write command FIFO memory 112 at operation 606 (assuming there is at least one write command entry stored in the write command FIFO memory 112) for execution of that dequeued write command entry at operation 612.

In more detail, if the determined number of write command entries stored in the write command FIFO memory 112 is greater than the second threshold ("Yes" at operation 604), the execution arbiter 110 will select a write command from the write command FIFO memory 112 on a first in, first out basis, and then the execution machine 116 will execute that selected write command at operation 612 and provide output such as data, commands and/or control signals generated as a result of the execution of the selected write command to the transfer manager 118. The transfer manager 118 can then transmit the data, commands and/or control signals to the read buffer 106, write buffer 108, cache memory 120, and/or memory media device 300.

If the determined number of write command entries stored in the write command FIFO memory 112 is not greater than the second threshold ("No" at operation 604), the memory controller 100 may then determine whether or not the read command FIFO 110 is not empty of read command entries at operation 608. If the read command FIFO 110 is not empty of read command entries ("Yes" at operation 608; i.e., there is at least one read command enqueued at the read command FIFO 110), the memory controller 100 may dequeue a read command from the read command FIFO 110 at operation 610 for execution of that dequeued read command entry at operation 612.

In more detail, if the determined number of write command entries stored in the write command FIFO memory 112 is not greater than the second threshold ("No" at operation 604) and the read command FIFO is not empty ("Yes" at operation 608; i.e., there is at least one read command stored in the read command FIFO 110), the execution arbiter 110 will select an enqueued read command from the read command FIFO 110 on a first in, first out basis, and then the execution machine 116 will execute that selected read command at operation 612 and provide output such as data, commands and/or control signals generated as a result of the execution of the selected read command to the transfer manager 118.

The transfer manager 118 can then transmit the data, commands and/or control signals to the read buffer 106, write buffer 108, cache memory 120, and/or memory media device 300. If the determined number of write command entries stored in the write command FIFO memory 112 is not greater than the second threshold ("No" at operation 604) and the read command FIFO is empty ("No" at operation 608; i.e., there is no read command entry stored in the read command FIFO 110), the execution arbiter 110 will select an enqueued write command from the write command FIFO 112 on a first in, first out basis for execution at operation 606 (assuming there is at least one write command entry stored in the write command FIFO memory 112) for execution of that dequeued write command entry at operation 612.

At least one write command entry being stored in the write command FIFO memory 112 can be determined in operation 602 based on the determined number of write command entries or alternatively a check that at least one write command entry being stored in the write command FIFO memory 112 may be performed after a "No" determination in operation 608 such that the executed process proceeds from such a determination in operation 608 to operation 606 if the check determines that there is indeed at least one write command entry stored in the write command FIFO memory 112.

Through the repeated execution of the process 600, a write command entry stored in the write command FIFO memory 112 will only be dequeued for execution when the number of write command entries stored in the write command FIFO memory 112 is higher than the second threshold "OnHoldWriteTh". The read command entries from the read command FIFO 110 may be consecutively dequeued and executed until the number of write command entries stored in the write command FIFO memory 112 is greater than the second threshold, at which time a write command entry will be dequeued from the write command FIFO memory 112 and executed.

As an example, in a case in which the write command FIFO memory 112 include maximum capacity 64 entries (which may the same capacity provided by the write buffer 108 for storing write commands), the second threshold value may be, for example, 52 (although this may be configured to be a different number). If, for example, the number of write command entries stored in the write command FIFO memory 112 is 50 and the number of read command entries stored in the read command FIFO 110 is 10 (i.e., much less than the 50 entries stored in the write command FIFO memory 112), a read command from the read command FIFO 110 is dequeued and executed (rather than a write command from the write command FIFO memory 112 being dequeued and executed).

At a subsequent iteration of the process 600, if the number of write command entries stored in the write command FIFO memory 112 is 50 and the number of read command entries stored in the read command FIFO 110 is now 9, another read command from the read command FIFO 110 is dequeued and executed (again, rather than a write command from the write command FIFO memory 112 being dequeued and executed).

The dequeuing and execution of additional read command entries from the read command FIFO 110 will continue until the number of write command entries stored in the write command FIFO exceeds the threshold value of 50 or if the read command FIFO is empty ("No" in operation 608). Even in a case where there is only a single read command entry stored in the read command FIFO 110 and the number of write command entries stored in the write command FIFO memory 112 is less than or equal to the second threshold (e.g., there are 50 write command entries stored in the write command FIFO memory 112 when the value of the second threshold is 52), that single read command entry stored in the read command FIFO 110 will still be executed rather than any of the write command entries stored in the write command FIFO memory 112.

Reducing the read latency as compared to the write latency is therefore prioritized. Reducing the read latency is prioritized over the write latency at least because when the host computing device 200 sends a read command to the memory controller 100, the host computing device 200 may become delayed while waiting for data to be acquired in response to the sent read command. Performing the process 600 manages the dequeuing and execution of read and write commands such that the read latency is reduced as compared to the write latency.

If the number of write command FIFO entries is greater than the second threshold ("Yes" in operation 604), write command entries in the write command FIFO memory 112 are dequeued and executed one at a time until the number of write command entries is at or under the second threshold. For example, in a case where there are 58 write command entries stored in the write command FIFO memory 112, 6 write command entries can be dequeued one at a time for execution so that the number of write command entries in the write command FIFO memory 112 is now at or under the second threshold value of 52.

When dequeuing those 6 write command entries one at a time so that the number of write command entries stored in the write command FIFO memory 112 becomes at or under the second threshold value of 52, the write command entries may be dequeued alternately with read command entries being dequeued such that the order of access command entries that are dequeued for execution is a write command, a read command, another write command, another read command, another write command and so on until the number of write command entries left in the write command FIFO memory 112 is at or under the second threshold value of 52 (in this example).

It should be noted that the processes described above describe possible implementations, and that the operations and the steps may be rearranged or otherwise modified and that other implementations are possible. Further, portions from two or more of the methods may be combined.

For example, and as can be appreciated from FIG. 2, a memory controller 100 may perform both processes 400 (FIG. 4) and 600 (FIG. 6), thereby obtaining the combination of all of the benefits discussed above resulting from each of the processes 400 and 600. Alternatively, a memory controller 100 may perform process 400 without necessarily performing process 600 in some example embodiments, whereas the memory controller 100 may perform process 600 without necessarily performing process 400 in other example embodiments.

Figure 7:
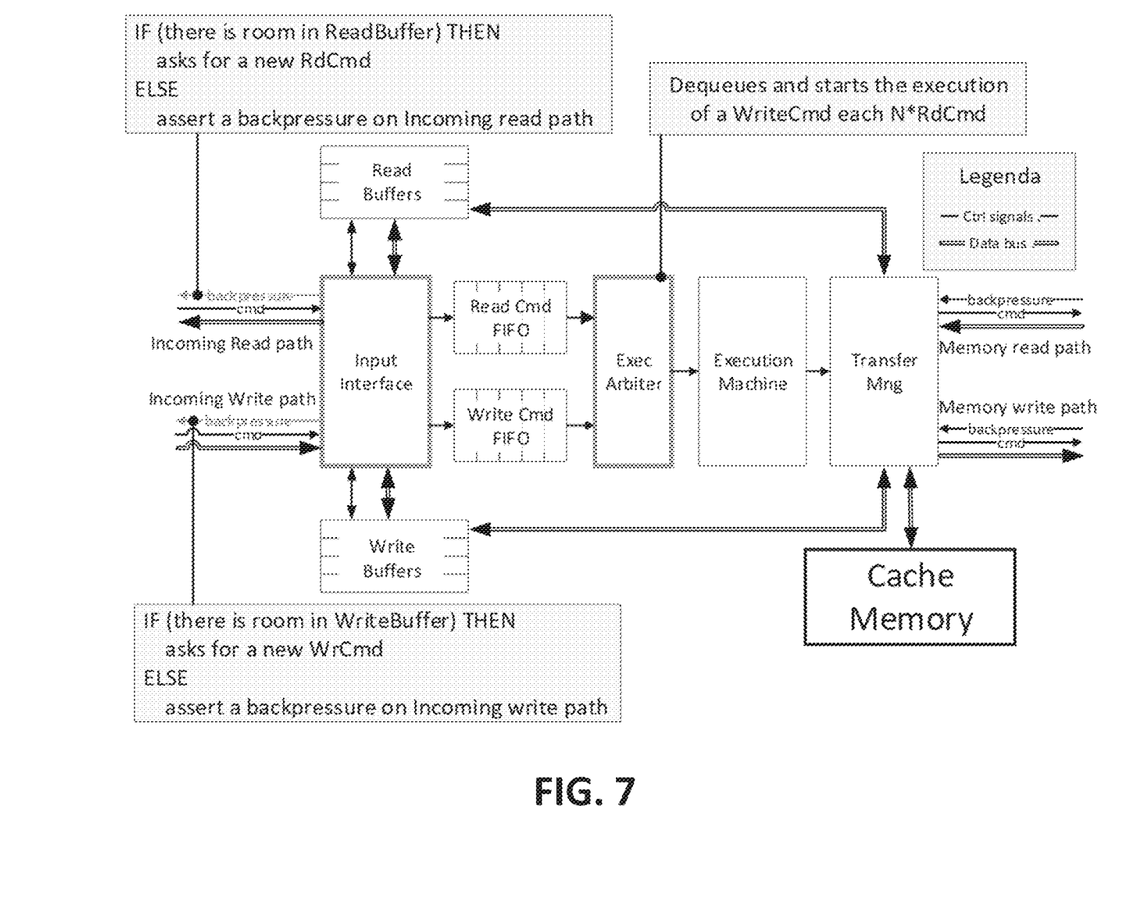
FIG. 7 illustrates a comparative computing system including a memory controller.

FIG. 7 shows a memory controller in accordance with a comparative example. In this comparative example, input back pressure is asserted on the incoming read path when there is no available read buffer (see "IF (there is room in ReadBuffer) THEN asked for a new RdCmd ELSE assert back pressure on incoming read path" in FIG. 7), and input back pressure is asserted on the incoming write path when there is no available write buffer (see "IF (there is room in Write Buffer) THEN asked for a new WrCmd ELSE assert back pressure on incoming write path" in FIG. 7). Also, the execution arbiter of the memory controller in accordance with the comparative example dequeues and sends for execution a write command each N read command.

For example, if N=32, then 32 read commands would be dequeued for execution for each write command to be dequeued for execution. This comparative example provides no control for the total number of read or write commands currently being sent for execution by the memory controller, and read latency is strongly dependent from the incoming workload of read and write commands. If the workload includes many write commands, the read command may take more latency.

The example embodiments of the present invention illustrated in FIGS. 1-6 resolve these problems by providing a virtual dynamic buffer allocation and optimizing control of read or write commands running in a memory controller. As discussed above, the present example embodiments control the number of the incoming commands to be executed by memory controller by stopping incoming commands if the global number of read and write commands exceeds a first threshold even if there is free space available inside the reader and write buffers.

The present example embodiments also reduces the latency of read commands independently of the read/write characteristics of the workload, and do not penalize the total read/write bandwidth. The present example embodiments further implement an arbitration policy of the execution arbiter that involves executing a write command only when the write command FIFO entries are greater than a second threshold, thereby putting write commands on hold and thus increasing the time slots to execute a read command dequeued from the read command FIFO.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "transmit", "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components.

At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components.

In some examples, the flow of signals between the connected components may be interrupted for a time, for example, using one or more intermediate components such as switches or transistors. The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly, as a result of the previous condition or action occurring independent of whether other conditions or actions occur.

In some examples, a first condition or action may be performed and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array or memory device, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory media devices)

can refer to one or more memory media devices, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled", and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A memory controller comprising:
    an interface configured to communicate with a host computing device;
    a read buffer operatively coupled to the interface;
    a write buffer operatively coupled to the interface; and
    processing circuitry at least configured to:
        compare a sum of a first number of entries stored in the read buffer and a second number of entries stored in the write buffer to a threshold;
        determine whether or not at least one of the read or write buffers is full of entries; and
        determine whether or not to assert backpressure on memory access commands from the host computing device based on the comparison of the sum to the threshold and the determination of whether or not the at least one of the read or write buffers is full of entries.

2. The memory controller of claim 1, wherein the processing circuitry is further configured to enable the memory controller to request read commands from the host computing device if (i) the sum of the first number of entries stored in the read buffer and the second number of entries stored in the write buffer is less than the threshold, and (ii) the read buffer is not full of entries.

3. The memory controller of claim 1, wherein the processing circuitry is further configured to enable the memory controller to assert the backpressure on read commands from the host computing device if (i) the sum of the first number of entries stored in the read buffer and the second number of entries stored in the write buffer is greater than or equal to the threshold, or (ii) the read buffer is full of entries.

4. The memory controller of claim 1, wherein the processing circuitry is further configured to enable the memory controller to request write commands from the host computing device if (i) the sum of the first number of entries stored in the read buffer and the second number of entries stored in the write buffer is less than the threshold, and (ii) the write buffer is not full of entries.

5. The memory controller of claim 1, wherein the processing circuitry is further configured to enable the memory controller to assert the backpressure on write commands from the host computing device if (i) the sum of the first number of entries stored in the read buffer and the second number of entries stored in the write buffer is greater than or equal to the threshold, or (ii) the write buffer is full of entries.

6. A method of operating a memory controller which includes an interface configured to communicate with a host computing device, a read buffer operatively coupled to the interface; and a write buffer operatively coupled to the interface; the method comprising:
    comparing a sum of a first number of entries stored in the read buffer and a second number of entries stored in the write buffer to a threshold;
    determining whether or not at least one of the read or write buffers is full of entries; and
    determining whether or not to assert backpressure on memory access commands from the host computing device based on the comparison of the sum to the threshold and the determination of whether or not the at least one of the read or write buffers is full of entries.

7. The method of claim 6, further comprising requesting incoming read commands from the host computing device if (i) the sum of the first number of entries stored in the read buffer and the second number of entries stored in the write buffer is less than the threshold, and (ii) the read buffer is not full of entries.

8. The method of claim 6, further comprising asserting backpressure on read commands from the host computing device if (i) the sum of the first number of entries stored in the read buffer and the second number of entries stored in the write buffer is greater than or equal to the threshold, or (ii) the read buffer is full of entries.

9. The method of claim 6, further comprising requesting incoming write commands from the host computing device if (i) the sum of the first number of entries stored in the read buffer and the second number of entries stored in the write buffer is less than the threshold, and (ii) the write buffer is not full of entries.

10. The method of claim 6, further comprising asserting the backpressure on write commands from the host computing device if (i) the sum of the first number of entries stored in the read buffer and the second number of entries stored in the write buffer is greater than or equal to the threshold, or (ii) the write buffer is full of entries.

11. A non-transitory computer-readable storage medium storing instructions that upon execution of a computer processing system causes a memory controller, which includes an interface configured to communicate with a host computing device, a read buffer operatively coupled to the interface; and a write buffer operatively coupled to the interface, to perform steps comprising:
    comparing a sum of a first number of entries stored in the read buffer and a second number of entries stored in the write buffer to a threshold;
    determining whether or not at least one of the read or write buffers is full of entries; and
    determining whether or not to assert backpressure on memory access commands from the host computing device based on the comparison of the sum to the threshold and the determination of whether or not the at least one of the read or write buffers is full of entries.

12. The non-transitory computer-readable storage medium of claim 11, wherein the memory controller is caused to perform steps further comprising requesting incoming read commands from the host computing device if (i) the sum of the first number of entries stored in the read buffer and the second number of entries stored in the write buffer is less than the threshold, and (ii) the read buffer is not full of entries.

13. The non-transitory computer-readable storage medium of claim 11, wherein the memory controller is caused to perform steps further comprising asserting backpressure on read commands from the host computing device if (i) the sum of the first number of entries stored in the read buffer and the second number of entries stored in the write buffer is greater than or equal to the threshold, or (ii) the read buffer is full of entries.

14. The non-transitory computer-readable storage medium of claim 11, wherein the memory controller is caused to perform steps further comprising requesting incoming write commands from the host computing device if (i) the sum of the first number of entries stored in the read buffer and the second number of entries stored in the write buffer is less than the threshold, and (ii) the write buffer is not full of entries.

15. The non-transitory computer-readable storage medium of claim 11, wherein the memory controller is caused to perform steps further comprising asserting the backpressure on write commands from the host computing device if (i) the sum of the first number of entries stored in the read buffer and the second number of entries stored in the write buffer is greater than or equal to the threshold, or (ii) the write buffer is full of entries.

* * * * *